(12) United States Patent
Weber

(10) Patent No.: US 11,084,653 B1
(45) Date of Patent: Aug. 10, 2021

(54) DEVICE FOR TRANSPORTING A DOLLY-STYLE TRASH BIN USING A VEHICLE

(71) Applicant: Thomas J. Weber, Akron, OH (US)

(72) Inventor: Thomas J. Weber, Akron, OH (US)

( * ) Notice: Subject to any disclaimer, the term of this patent is extended or adjusted under 35 U.S.C. 154(b) by 0 days.

(21) Appl. No.: 17/063,011

(22) Filed: Oct. 5, 2020

(51) Int. Cl.
| | |
|---|---|
| B65F 1/14 | (2006.01) |
| B60R 9/06 | (2006.01) |
| B62B 5/00 | (2006.01) |
| B60D 1/60 | (2006.01) |
| B62B 5/06 | (2006.01) |
| B60D 1/06 | (2006.01) |

(52) U.S. Cl.
CPC ............. B65F 1/141 (2013.01); B60D 1/06 (2013.01); B60D 1/60 (2013.01); B60R 9/06 (2013.01); B62B 5/0079 (2013.01); B62B 5/06 (2013.01); *B62B 2202/20* (2013.01)

(58) Field of Classification Search
CPC ............. B65F 1/141; B65F 2220/108; B65F 2001/0086; B65F 1/1468; B65F 1/1473; B60R 9/06; B62B 2202/20; B62B 5/0079
See application file for complete search history.

(56) References Cited

U.S. PATENT DOCUMENTS

| | | | | |
|---|---|---|---|---|
| 4,113,214 A * | 9/1978 | Dubois | ................... | B62B 1/264 248/146 |
| 6,196,612 B1 * | 3/2001 | Grimes | ................ | B60N 2/3011 293/117 |
| 7,021,644 B1 * | 4/2006 | Master | ..................... | B60D 1/00 280/480 |
| 7,188,745 B2 * | 3/2007 | Schermel | .............. | B65F 1/1468 220/23.4 |
| 7,614,637 B1 * | 11/2009 | Kidd | ........................ | B60D 1/00 224/519 |
| 7,871,089 B1 * | 1/2011 | Henderson | .............. | B62B 1/042 280/47.27 |
| 8,162,192 B1 * | 4/2012 | Sanchez | ................ | B65F 1/1473 224/521 |
| 8,215,691 B2 * | 7/2012 | Ewing | ....................... | B60R 5/04 296/26.02 |
| 8,550,318 B2 * | 10/2013 | Tortumlu | .............. | B65F 1/1468 224/520 |
| D703,410 S * | 4/2014 | Sisko | ............................. | D34/10 |
| 9,085,207 B1 * | 7/2015 | Sweet | .................... | B65F 1/1468 |
| 9,150,066 B1 * | 10/2015 | Cooper | .................. | B65F 1/1468 |

(Continued)

*Primary Examiner* — Tony H Winner
*Assistant Examiner* — Michael R Stabley
(74) *Attorney, Agent, or Firm* — Renner Kenner Greive Bobak Taylor & Weber

(57) ABSTRACT

A transport device for transporting a dolly-style trash bin using a vehicle includes a protective tow pad. The protective tow pad includes a trunk latch opening, a right wing portion extending to the right of the trunk latch opening, and a left wing portion extending to the left of the trunk latch opening, wherein the trunk latch opening is adapted to permit the operation of a trunk latch mechanism of a vehicle through the trunk latch opening to pinch the right wing portion and the left wing portion between a trunk door and a trunk jamb and thereby secure the transport device to the vehicle. The transport device further includes a bin handle cradle secured to the protective tow pad and adapted to receive a dolly handle of the dolly-style trash bin. A tandem trash bin arrangement is also disclosed.

18 Claims, 11 Drawing Sheets

(56) References Cited

U.S. PATENT DOCUMENTS

| | | | |
|---|---|---|---|
| 9,211,771 B1* | 12/2015 | Charbonnier | B60D 1/58 |
| 9,963,080 B2* | 5/2018 | Swan | B60D 1/58 |
| 2004/0007574 A1* | 1/2004 | Most | B65F 1/1468 |
| | | | 220/23.4 |
| 2004/0164517 A1 | 8/2004 | Lewy et al. | |
| 2004/0232184 A1 | 11/2004 | Moen et al. | |
| 2005/0023796 A1* | 2/2005 | Rasmussen | B60D 1/00 |
| | | | 280/400 |
| 2006/0291985 A1 | 12/2006 | Sullivan | |
| 2007/0018475 A1* | 1/2007 | McGinnis | B60R 13/01 |
| | | | 296/39.1 |
| 2007/0029827 A1* | 2/2007 | Meyer | B60R 19/44 |
| | | | 293/142 |
| 2007/0158346 A1* | 7/2007 | Crutchfield | B65F 1/141 |
| | | | 220/23.4 |
| 2009/0283987 A1 | 11/2009 | Long et al. | |
| 2017/0087421 A1* | 3/2017 | Chabot | A63B 47/02 |
| 2017/0268190 A1* | 9/2017 | Moore | E01H 5/00 |
| 2020/0047994 A1* | 2/2020 | Fisk | B65F 1/1468 |

* cited by examiner

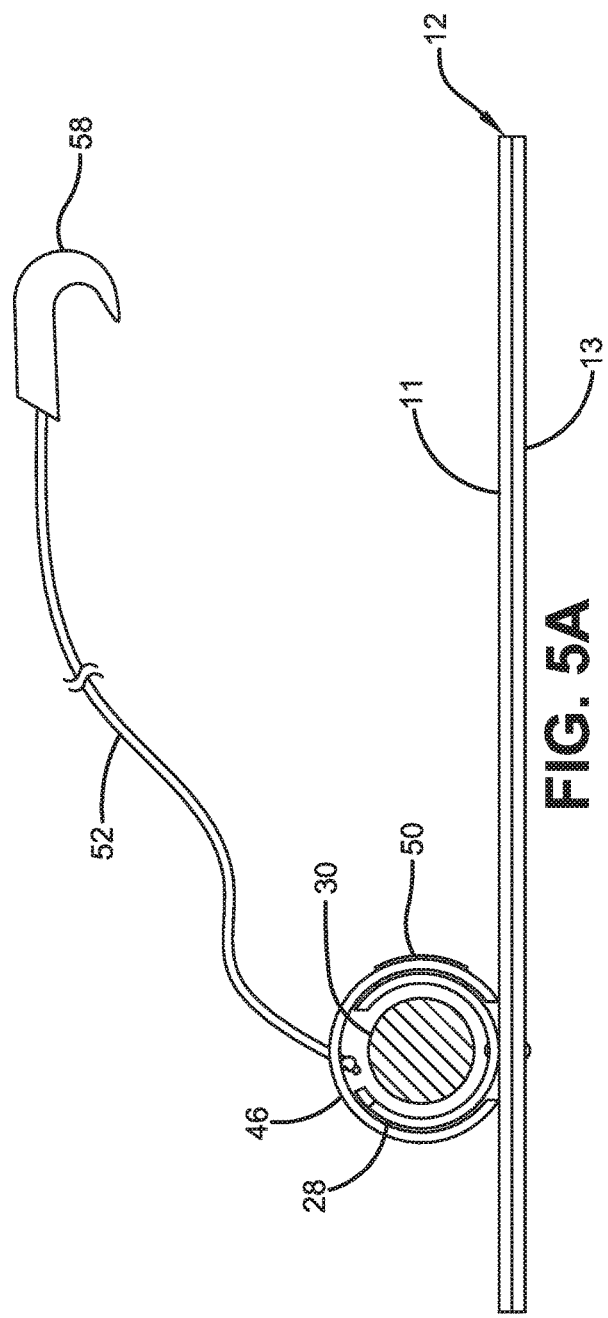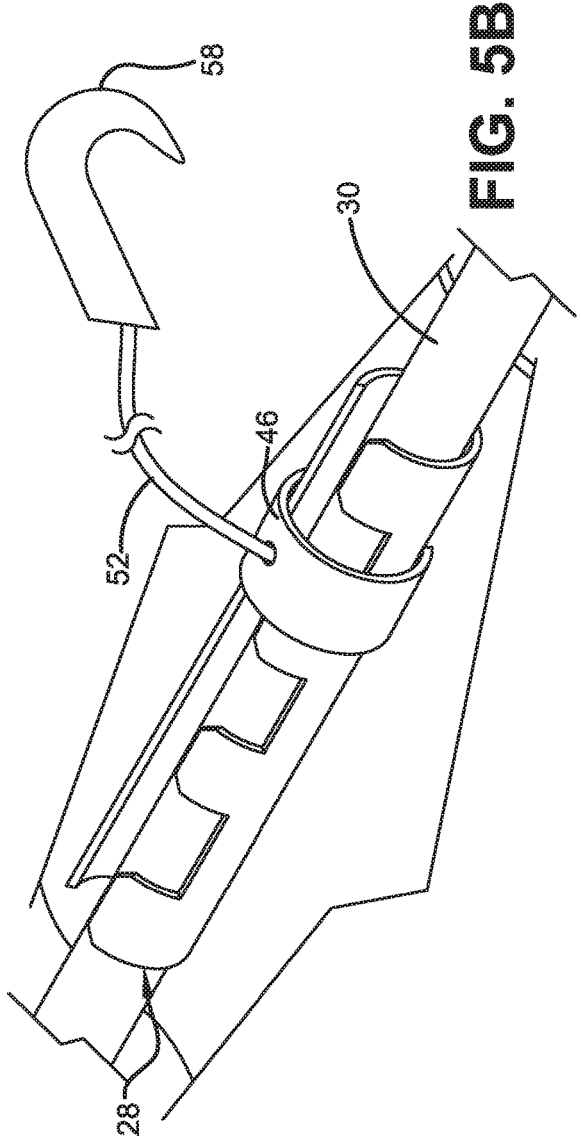

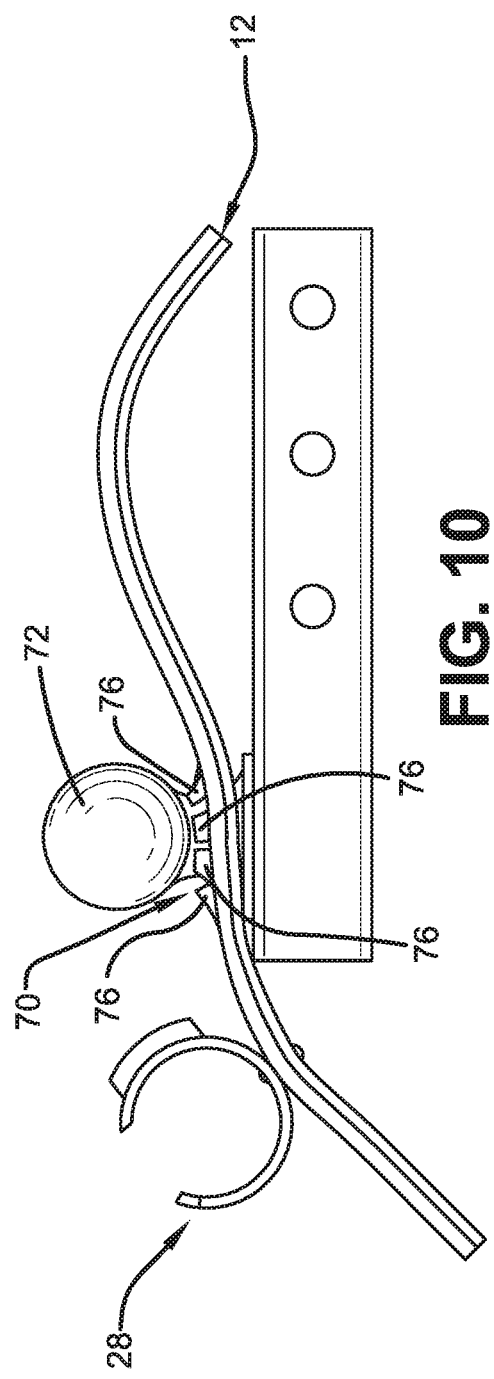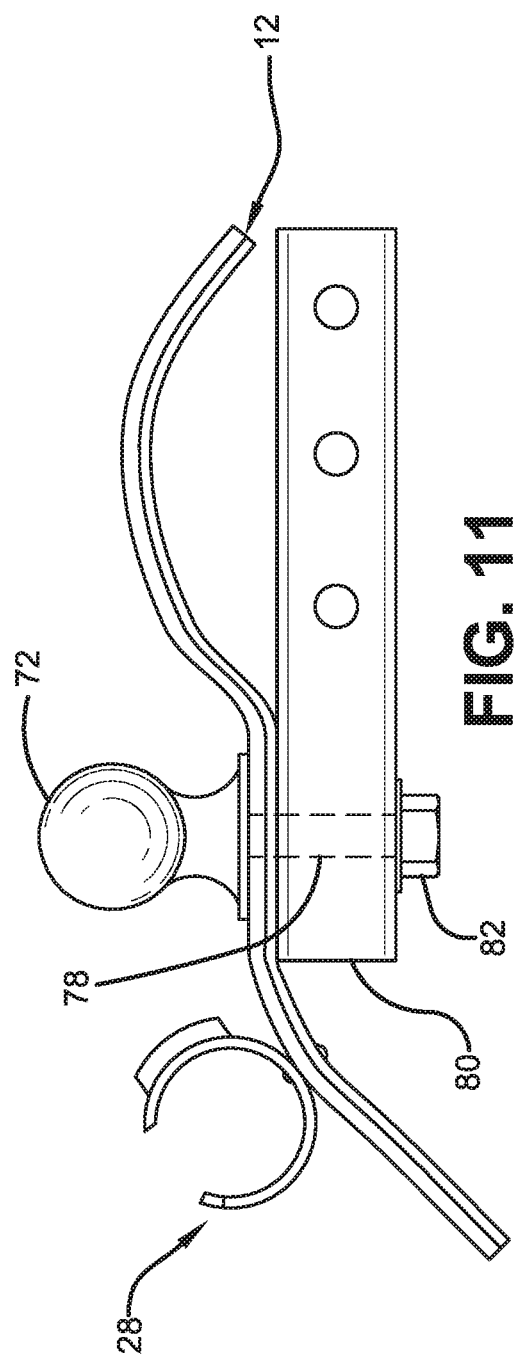

DEVICE FOR TRANSPORTING A DOLLY-STYLE TRASH BIN USING A VEHICLE

FIELD OF THE INVENTION

In general, the invention is directed to a device adapted to transport trash bins for residential waste collection purposes. Specifically, the device is secured to the rear of a vehicle to transport a dolly-style trash bin using the vehicle.

BACKGROUND OF THE INVENTION

Dolly style trash bin are now ubiquitous, as many municipalities issue them to residents and mandate their use. Transporting these bins to the curb for collection by a waste/recycling pickup service can be difficult form many individual, particularly those with long or inclined driveways or those with physical limitations who may have difficulty transporting their bins from the household to the curb and back, safely. Safe transport is particularly difficult for consumers with lengthy, steeply inclined or declined, or gravel, slag or otherwise unpaved driveways. Further, adverse weather conditions can increase the difficulty of safe transport of trash bins to the curb.

Use of a passenger vehicle, such as a car or truck, to transport a trash and/or recycling bin can provide a lower effort and safer means for the user to transport the bin to the curb for pickup. Though some means to mount a trash bin to be pulled behind a vehicle are proposed in the art, for instance, in Lewy US20040164517, Moen US20040232184, Sullivan US20060291985, and Long US20090283987, they suffer from design flaws, and the art can benefit from an improved device for transporting a dolly-style trash bin using a vehicle. For instance, Sullivan provides an insufficient base support to secure to the vehicle, and an insufficient handle receipt means in the form of opposed hooks. There is also no provision for protecting the vehicle form the trash bin. There exists a need for a device that allows consumers to take advantage of the power and capabilities of their vehicle to safely and securely attach their wheeled trash bin to the outside of a vehicle for transport to the curb.

SUMMARY OF THE INVENTION

An embodiment of the present invention provides a transport device for transporting a dolly-style trash bin using a vehicle, the transport device comprising a protective tow pad having: a trunk latch opening, a right wing portion extending to the right of the trunk latch opening, and a left wing portion extending to the left of the trunk latch opening, wherein the trunk latch opening is adapted to permit the operation of a trunk latch mechanism of a vehicle through the trunk latch opening to pinch the right wing portion and the left wing portion between a trunk door and a trunk jamb and thereby secure the transport device to the vehicle; and a bin handle cradle secured to the protective tow pad and adapted to receive a dolly handle of the dolly-style trash bin.

Another embodiment of the present invention provides a transport device as in any embodiment above, wherein the protective tow pad reduces the likelihood of marking the vehicle with the transport device and/or trash bin during transport of the trash bin with a vehicle.

Another embodiment of the present invention provides a transport device as in any embodiment above, wherein the protective tow pad is formed of a compressible material positioned to cushion forces on the vehicle under the weight of a trash bin, when the transport device is secured to the vehicle and the dolly handle of the trash bin is received in the bin handle cradle.

Another embodiment of the present invention provides a transport device as in any embodiment above, wherein the compressible material forms the right wing portion and the left wing portion and is compressed between the trunk door and trunk jamb when the transport device is secured to the vehicle.

Another embodiment of the present invention provides a transport device as in any embodiment above, wherein the protective tow pad is formed from a fabric backed with a backing material.

Another embodiment of the present invention provides a transport device as in any embodiment above, wherein the right wing portion is at least 4 inches in width where pinched by the trunk door and trunk jamb, and the left wing portion is at least 4 inches in width where pinched by the trunk door and trunk jamb.

Another embodiment of the present invention provides a transport device as in any embodiment above, wherein the protective tow pad is custom fit to a particular vehicle model to lay over the portions of the vehicle that are exterior to the trunk at the location of securing the transport device to the vehicle.

Another embodiment of the present invention provides a transport device as in any embodiment above, wherein the trunk latch opening is large enough to provide at least a 4-inch diameter hole to allow the transport device to be secured in different positions relative to the trunk latch mechanism.

Another embodiment of the present invention provides a transport device as in any embodiment above, wherein the bin handle cradle is shaped to resist removal of the dolly handle to resist the dolly handle being jostled out of the bin handle cradle during transport with a vehicle.

Another embodiment of the present invention provides a transport device as in any embodiment above, wherein the bin handle cradle includes a handle opening having a top end and bottom end distanced from each other by a distance less than an insertion height of the handle to resist insertion and removal of the dolly handle.

Another embodiment of the present invention provides a transport device as in any embodiment above, wherein the bin handle cradle is elongate and the handle opening is elongate, extending along a width of the trunk when secured to the vehicle.

Another embodiment of the present invention provides a transport device as in any embodiment above, wherein the transport device further comprises a retainer adapted to interact with the bin handle cradle to resist removal of the dolly handle from the bin handle cradle.

Another embodiment of the present invention provides a transport device as in any embodiment above, wherein the retainer is selectively mounted to the bin handle cradle to close off the handle opening.

Another embodiment of the present invention provides a transport device as in any embodiment above, wherein the retainer fits over the bin handle cradle.

Another embodiment of the present invention provides a transport device as in any embodiment above, wherein the retainer fits within the bin handle cradle.

Another embodiment of the present invention provides a transport device as in any embodiment above, wherein the transport device further comprises protective material on an exterior surface of the bin handle cradle reducing the likelihood of marking the vehicle with the transport device and/or trash bin during transport of the trash bin with a vehicle.

Another embodiment of the present invention provides a transport device as in any embodiment above, wherein the tow pad further comprises a ball hitch aperture adapted to selectively permit the mounting of the transport device to a ball hitch receiver of a vehicle.

Another embodiment of the present invention provides a transport device as in any embodiment above, wherein the ball hitch aperture receives a stem of a ball hitch therethrough to pinch the tow pad between the ball hitch and a ball hitch receiver to which the ball hitch selectively mounts.

A tandem trash bin arrangement comprising: a first dolly-style trash bin having a dolly handle and wheels at a leading side of the first dolly-style trash bin and having a trailing side opposite the leading side; a second dolly-style trash bin having a dolly handle and wheels at a leading side of the second dolly-style trash bin and having a trailing side opposite the leading side; a tandem transport device retained at the trailing side of the first dolly-style trash bin, the dolly handle of the second dolly-style trash bin being received in the handle mount such that the second dolly-style trash bin is mounted to the first dolly-style trash bin for transportation of both through manipulation of the dolly handle of the first dolly-style trash bin.

Another embodiment of the present invention provides a tandem trash bin arrangement as in any embodiment above, wherein the tandem transport device is mounted fixedly to the first dolly-style trash bin.

Another embodiment of the present invention provides a tandem trash bin arrangement as in any embodiment above, wherein the tandem transport device includes straps extending from the handle mount to mount the handle mount to the first dolly-style trash bin.

Another embodiment of the present invention provides a tandem trash bin arrangement as in any embodiment above, wherein is the handle mount is a bin handle cradle shaped to resist removal of the dolly handle to resist the dolly handle being jostled out of the handle mount during transport with a vehicle.

Another embodiment of the present invention provides a tandem trash bin arrangement as in any embodiment above, wherein the bin handle cradle includes a handle opening having a top end and bottom end distanced from each other by a distance less than an insertion height of the handle to resist insertion and removal of the dolly handle.

Another embodiment of the present invention provides a tandem trash bin arrangement as in any embodiment above, wherein the handle cradle is elongate and the handle opening is elongate, Another embodiment of the present invention provides a tandem trash bin arrangement as in any embodiment above, wherein further comprising a retainer adapted to interact with the handle mount to resist removal of the dolly handle from the handle mount.

BRIEF DESCRIPTION OF THE DRAWINGS

FIG. 5A is a cross section taken along the line 3-3 of FIG. 1 and schematically showing the receipt of a handle of a dolly-style trash bin in the cradle portion of the transport device according to some embodiments, and showing a retainer to help retain the handle in the cradle.

FIG. 5B is a perspective view of the retainer of FIG. 5A relative to a cradle portion.

FIG. 10 is a side view of one manner of mounting a transport device of this invention to a ball hitch of a vehicle.

FIG. 11 is a side view of another manner of mounting a transport device of this invention to a ball hitch of a vehicle.

DETAILED DESCRIPTION OF ILLUSTRATIVE EMBODIMENTS

The present invention is directed towards a device for transporting a dolly-style trash bin using a vehicle.

Figure 1:
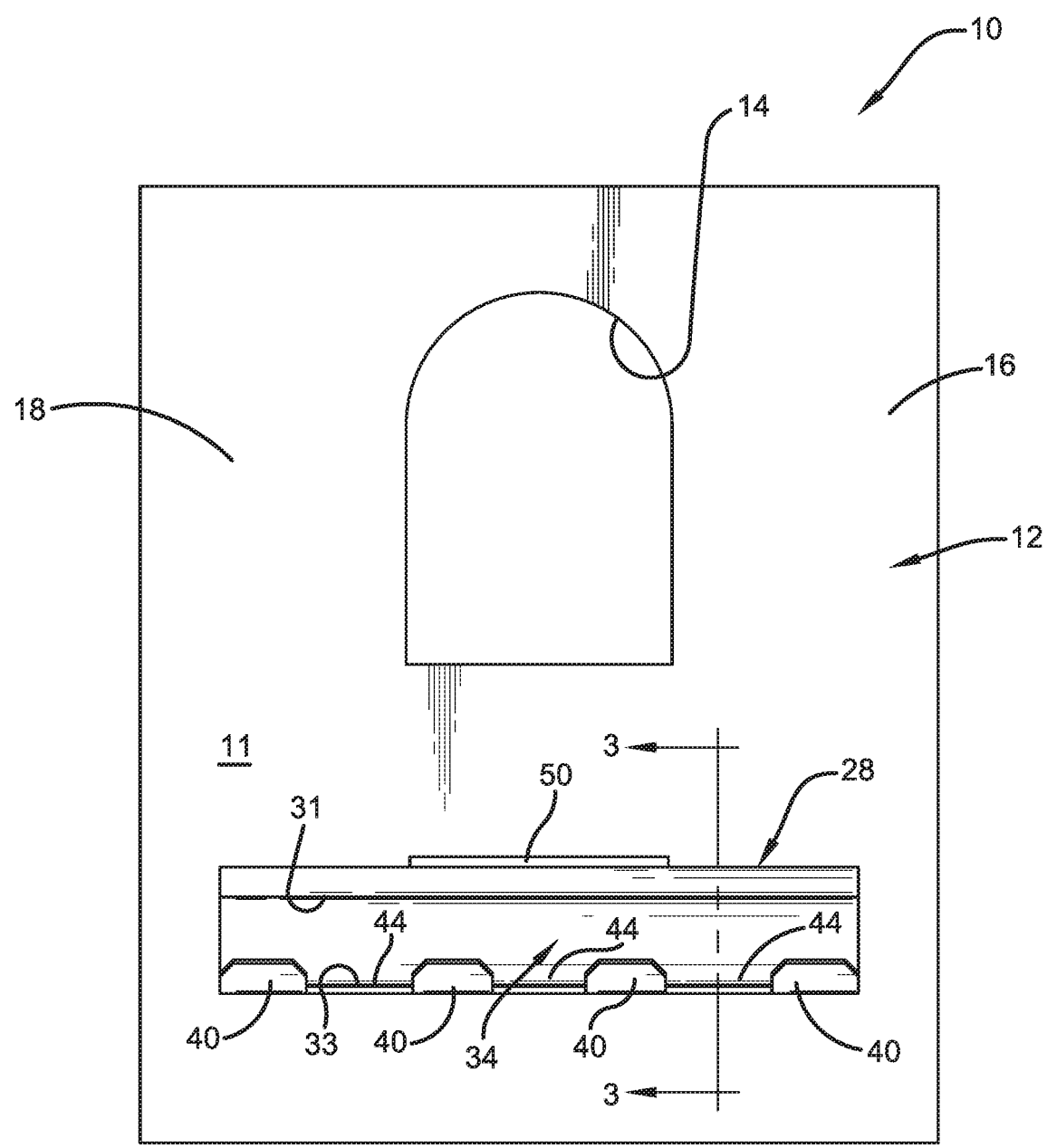
FIG. 1 is a top view of a transport device of this invention.
Figure 2:
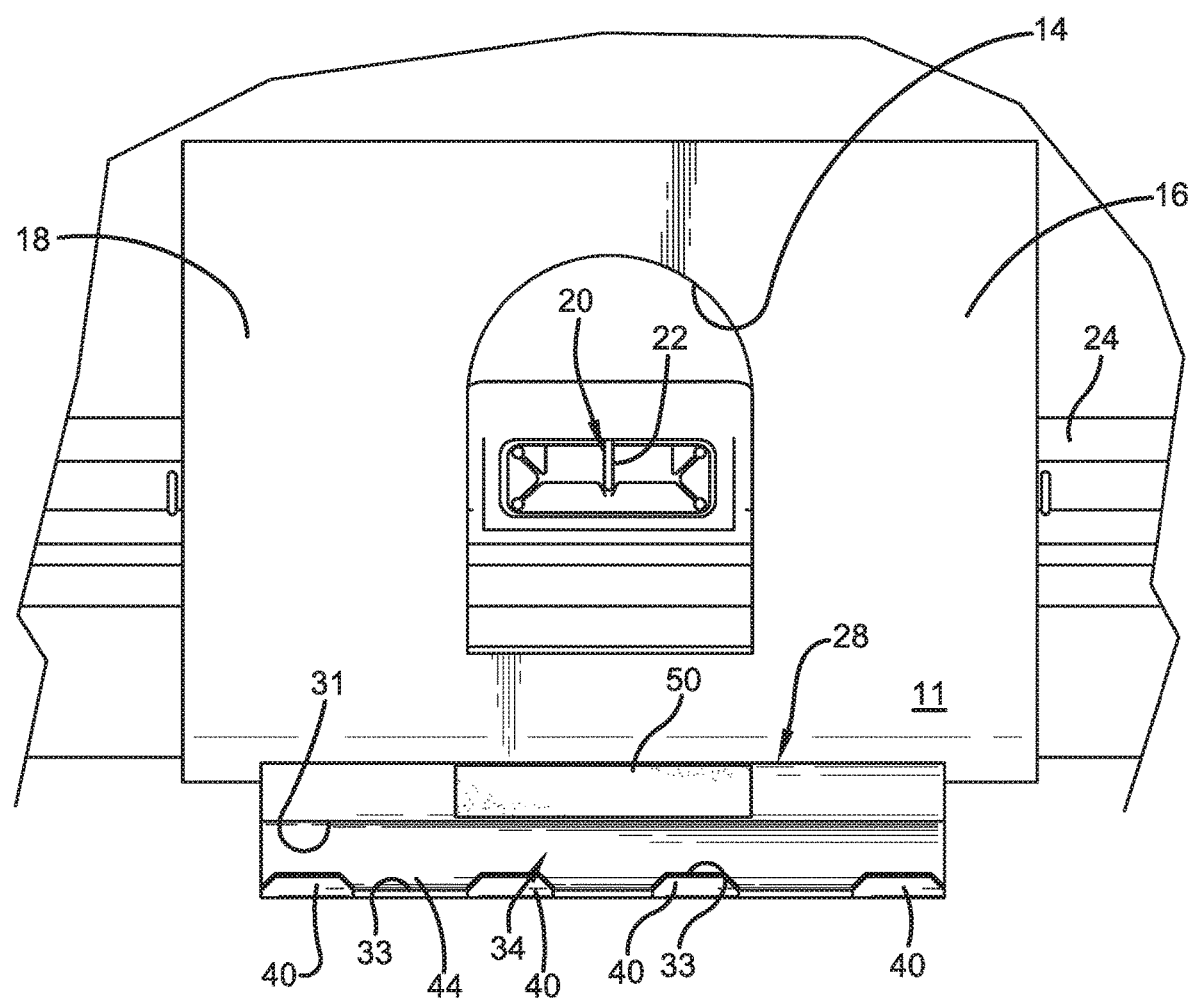
FIG. 2 is a top view of the transport device positioned over the truck latch area at an open trunk at the rear of a vehicle.
Figure 7:
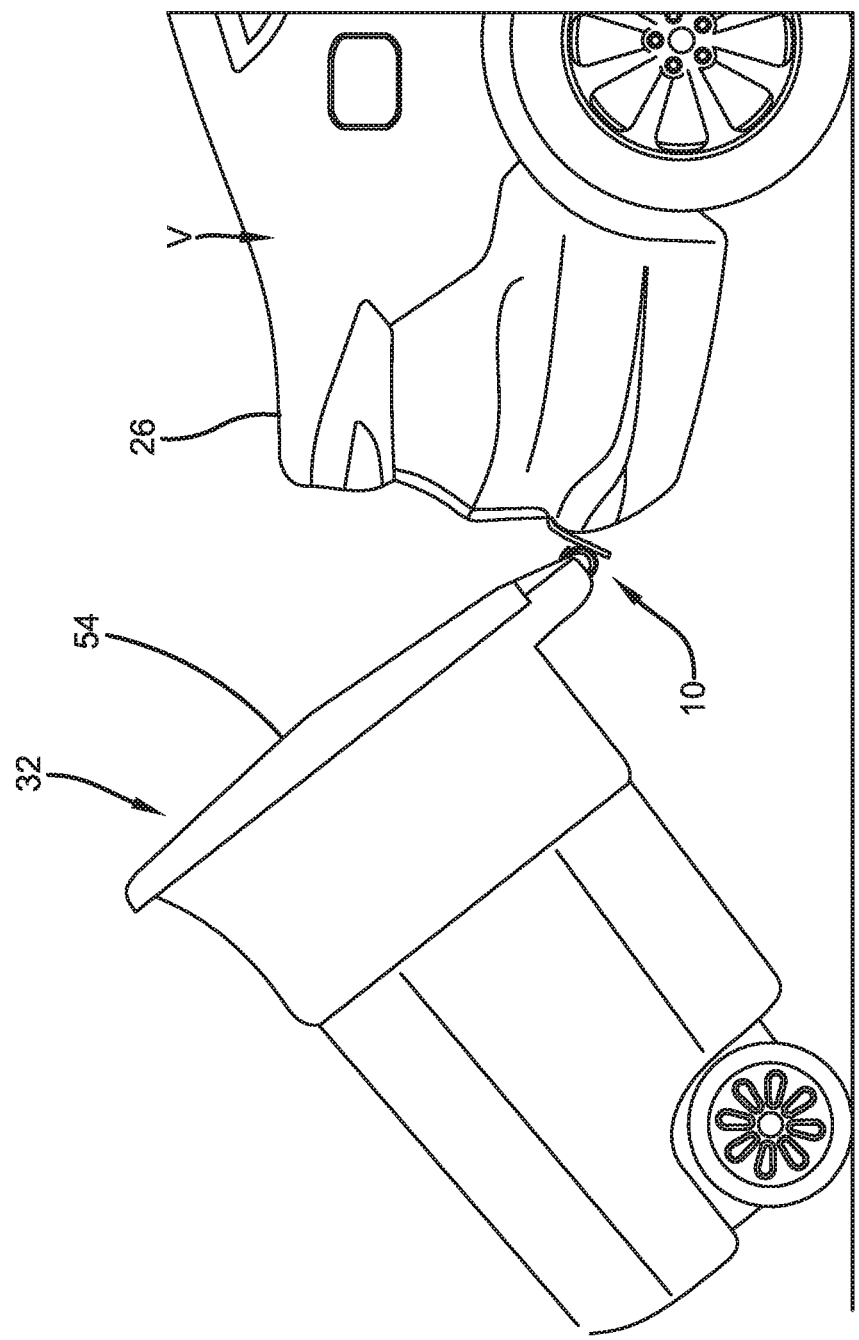
FIG. 7 is a side view showing a transport device carrying a dolly-style trash bin at the trunk of a vehicle according to some embodiments.

As shown in FIGS. 1, 2, and 7 the transport device 10 includes a protective tow pad 12. The protective tow pad 12 includes a trunk latch opening 14, a right wing portion 16 extending to the right of the trunk latch opening 14, and a left wing portion 18 extending to the left of the trunk latch opening 14. The trunk latch opening 14 is adapted to permit the operation of a trunk latch mechanism 20 including interaction of a latch (not shown) and catch 22. Generally, the catch 22 is provided in the trunk jam 24 of a vehicle v, and the latch is provided in the trunk door 26. The latch and catch 22 (i.e., the trunk latch mechanism 20) interact through the trunk latch opening 14 to pinch the right wing portion 16 and the left wing portion 18 between the trunk door 26 and a trunk jamb 24 (and/or body of the vehicle v) which thereby secures the transport device 10 to the vehicle v. A bin handle cradle 28 is secured to the protective tow pad 12 and is adapted to receive a dolly handle 30 of the dolly-style trash bin 32 such that the bin 32 can be pulled behind the vehicle v in standard dolly fashion on its wheels 35. Any suitable fastener 90 can be employed to secure the cradle 28 to the pad 12, and, in the embodiment shown, the cradle 28 is secured by metal rivets with securing washers. In some embodiments, aluminum pop rivets are used.

In one embodiment, the protective tow pad 12 reduces the likelihood of scratching or otherwise marring the vehicle v with the transport device 10 and/or trash bin 32 during transport of the trash bin 32 with a vehicle v. In some embodiments, the protective tow pad 12 is formed of a compressible material positioned to cushion forces on the vehicle v under the weight of a trash bin 32, when the transport device 10 is secured to the vehicle v and the dolly handle 30 of the trash bin is received in the bin handle cradle 28.

In other embodiments, the compressible material forms at least the right wing portion 16 and the left wing portion 18 and is compressed between the trunk door 26 and trunk jamb 24 when the transport device 10 is secured to the vehicle v. The compressible material allows for the transport device 10 to be secured between the trunk door 26 and trunk jamb 24 without interfering with the function of the trunk latch mechanism 20.

Figure 3:
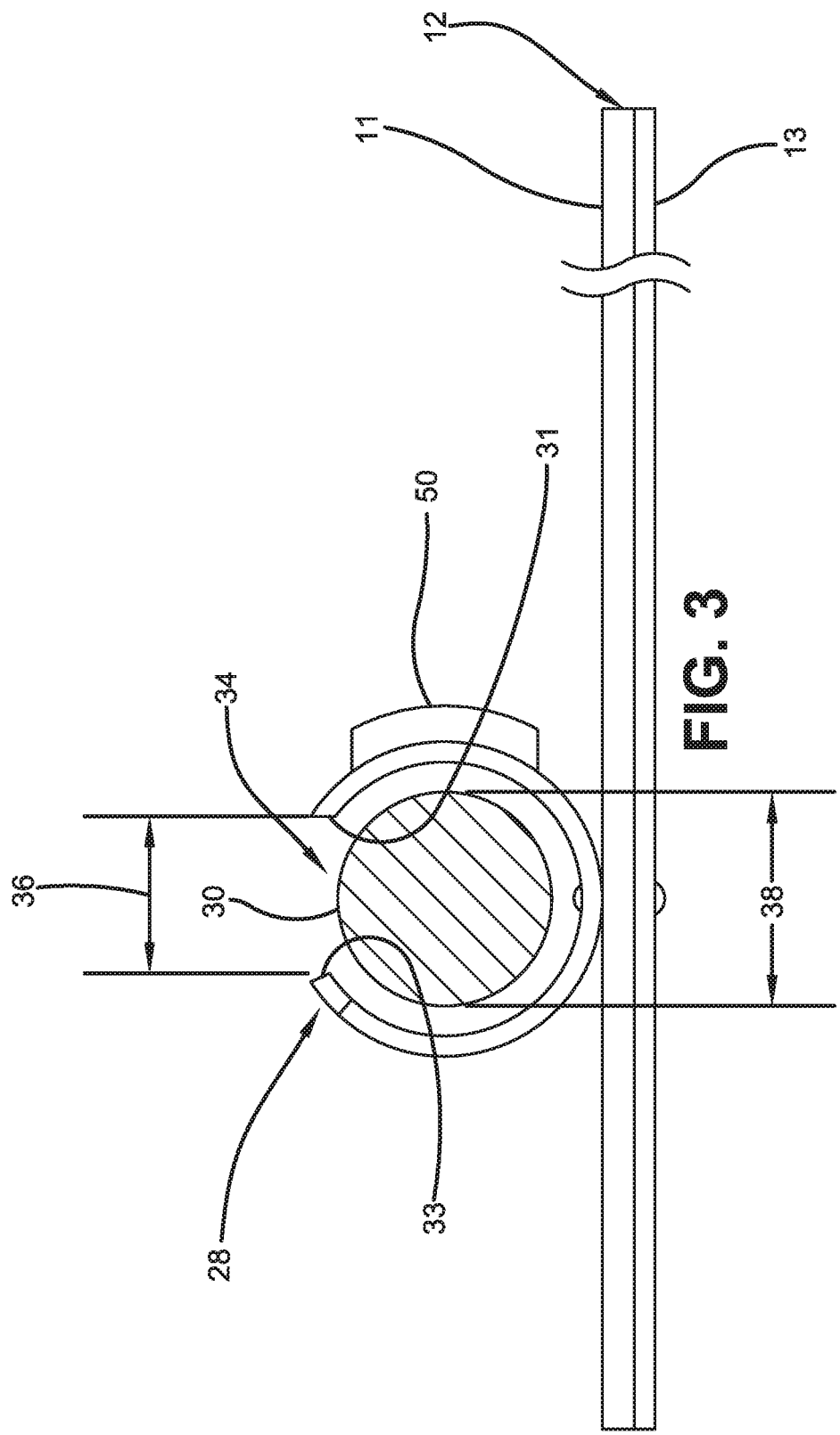
FIG. 3 is a cross section taken along the line 3-3 of FIG. 1 and schematically showing the receipt of a handle of a dolly-style trach bin in the cradle portion of the transport device according to some embodiments.

As shown in FIG. 3, in some embodiments the protective tow pad 12 is formed from a fabric 11 backed with a backing material 13. In some embodiments, the backing material 13 is selected from rubber, recycled rubber, vinyl, urethane, recycled vinyl, polypropylene, and the like. In some embodiments the backing material 13 is 100% laminated, extruded, and compressible latex. In some embodiments, the fabric 11 is selected from cotton, synthetic fabrics, plant products, and the like. In some embodiments, the fabric 11 is 100% interwoven polyester. When such embodiments are in use, the backing material forms the base and the fabric the top of the device, with the cradle 28 secured to the top fabric side.

In some embodiments, the right wing portion 16 is at least 2.5 inches in width where pinched by the trunk door 26 and trunk jamb 24, and the left wing portion 18 is at least 2.5 inches in width where pinched by the trunk door 26 and trunk jamb 24. In some embodiments, the right wing portion 16 is at least 3 inches in width where pinched by the trunk door 26 and trunk jamb 24, and the left wing portion 18 is at least 3 inches in width where pinched by the trunk door 26 and trunk jamb 24. In some embodiments, the right wing portion 16 is at least 3.5 inches in width where pinched by the trunk door 26 and trunk jamb 24, and the left wing portion 18 is at least 3.5 inches in width where pinched by the trunk door 26 and trunk jamb 24. In some embodiments, the right wing portion 16 is at least 4 inches in width where pinched by the trunk door 26 and trunk jamb 24, and the left wing portion 18 is at least 4 inches in width where pinched by the trunk door 26 and trunk jamb 24. This helps ensure the trunk latch mechanism 82 holds the transport device 10 in place against the trunk jamb 24 during use of the transport device 10 and the left and right wing portions 18 and 16 are pinched and to secure the bin against wobbling.

Figure 4:
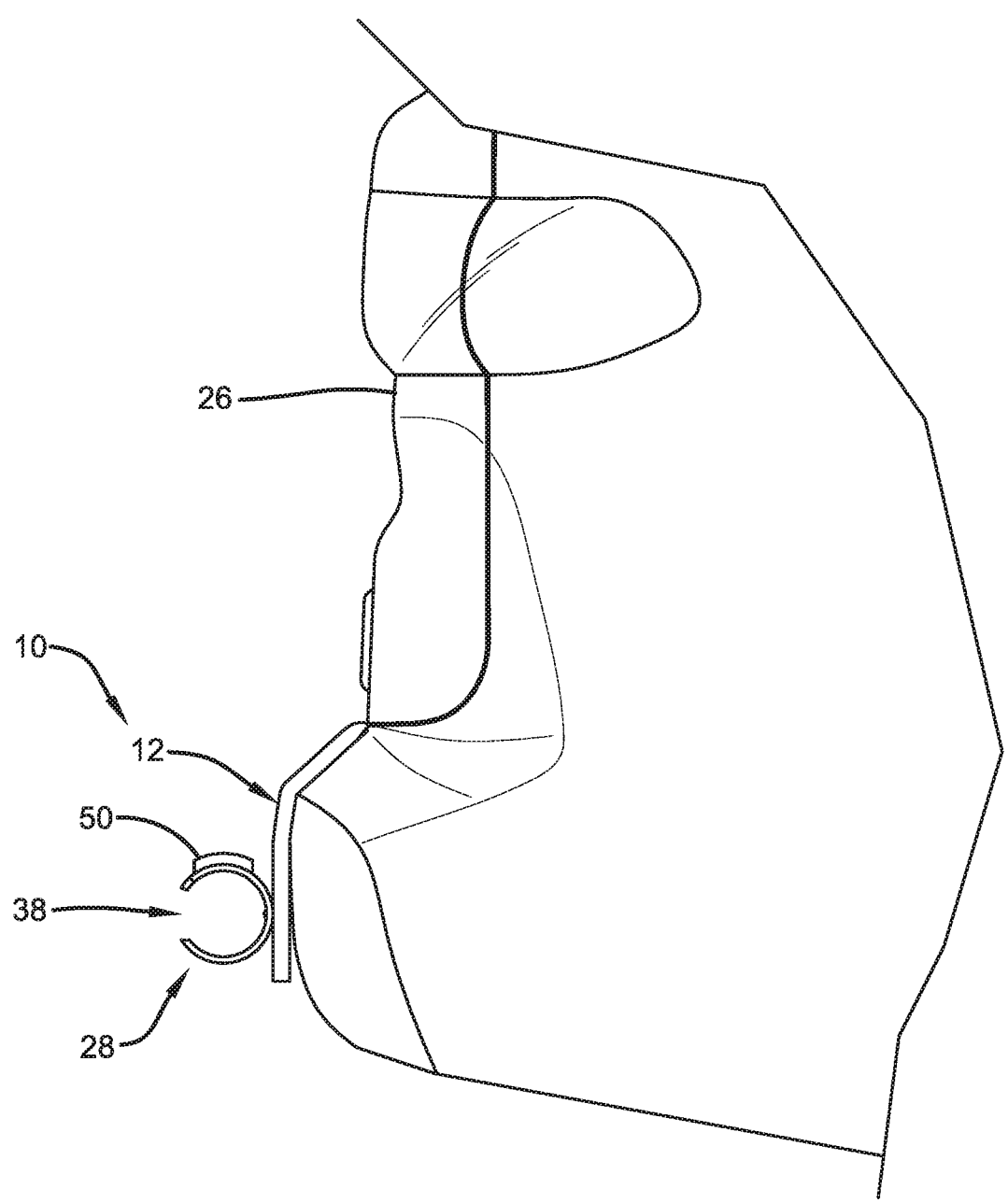
FIG. 4 is a side view showing an embodiment of a transport device according to some embodiments being generally form fit to the contours of a vehicle to which it is mounted at the trunk.

As seen in FIG. 4, in some embodiments, the protective tow pad 12 is precision, custom fit to a particular vehicle model to lay over the portions of the vehicle v that are exterior to the trunk at the location of securing the transport device 10 to the vehicle v. Such precision, custom fit technology is used by WeatherTech® in the automotive floor mat and accessory industry to fit floor mats to various vehicle models, and similar advancements can be made with the present invention.

The trunk latch opening 14 is not limited to any particular shape. In some embodiments, the trunk latch opening 14 is at least 9 in$^2$ to allow the transport device 10 to be secured in different positions relative to the trunk latch mechanism 82 and make the opening 14 more universal to accommodate various latch/catch mechanisms. In some embodiments, the trunk latch opening 14 is at least 3 in$^2$. In some embodiments, the trunk latch opening 14 is at least 4 in$^2$. In some embodiments, the trunk latch opening 14 is at least 5 in$^2$. In some embodiments, the trunk latch opening 14 is at least 6 in$^2$. In some embodiments, the trunk latch opening 14 is at least 7 in$^2$. In some embodiments, the trunk latch opening 14 is at least 8 in$^2$. In some embodiments, the trunk latch opening is circular and having at least a 2-inch diameter. In some embodiments, the trunk latch opening is circular and having at least a 2.5-inch diameter. In some embodiments, the trunk latch opening is circular and having at least a 3-inch diameter. In some embodiments, the trunk latch opening is circular and having at least a 3.5-inch diameter. In some embodiments, the trunk latch opening is circular and having at least a 4-inch diameter. In some embodiments, the trunk latch opening is square having at least 2-inch sides. In some embodiments, the trunk latch opening is square having at least 2.5-inch sides. In some embodiments, the trunk latch opening is square having at least 3-inch sides. In some embodiments, the trunk latch opening is square having at least 3.5-inch sides. In some embodiments, the trunk latch opening is square having at 4-inch sides.

In some embodiments, the bin handle cradle 28 is shaped to resist removal of the dolly handle 30 to prevent the dolly handle 30 being jostled out of the bin handle cradle 28 during transport with a vehicle v. As seen in FIG. 3, in some embodiments, the bin handle cradle 28 includes a handle opening 34 having a top end 31 and bottom end 33 distanced from each other by a distance 36 that permits the insertion of the handle 30 into the cradle 28. In some embodiments, the top end 31 is distanced from the bottom end 33 at a distance less than an insertion height 38 of the handle 30. This resists insertion and removal of the dolly handle 30, and provides a snap-receipt type mechanism when the cradle 28 is formed of a material and shape that is somewhat flexible and resilient, able to give but then snap back to shape, such as the C-shape shown.

In some embodiments, the bin handle cradle 28 is elongate and the handle opening 34 is elongate, extending along a width of the trunk when secured to the vehicle v. Such configuration allows for the weight of the trash bin to be distributed along the width of the elongate cradle 28 and the portion of the pad 12 and the portion of the vehicle v thereunder. The elongate structure evens distribution of weight of the bin and prevents damage to the transport device 10 and vehicle v. The elongate shape also works in tandem with the well-defined right wing portion 16 and left wing portion 18 that sturdily secure the device 10 between a trunk and jamb. The bin 32 remains stable even as minor bumps or divots in the road/driveway are encountered during moving a trash bin 32 with the device 10 and a vehicle v.

In some embodiments, the opening 34 is structured with teeth 40 that help to define the bottom end 33, with the distal ends 42 of the teeth 40 defining the portion of the bottom end 33 that defines the acceptable insertion height 38 of the handle 30. Gaps 44 are defined between the teeth 40. In some embodiments, the bin handle cradle 28 is 12 inches long; distance 36 is from 1⅛ to 1³⁄₁₆ inches measure between the distal ends 42 of teeth 40; the teeth 40 are 4 in number (as per FIG. 2), with the first extending from 0 to 1⅝ inches along the cradle 28, the second extending from 3⅝ to 5⅛ inches, the third extending from 6⅞ to 8⅜ inches, and the forth from 10⅞ to 12 inches. In some such embodiments, the gaps 44 between the teeth have a depth of at least 1¼ inches measured relative to the distal ends 42 of the teeth 40.

In some embodiment, the bin handle cradle 28 is cylindrical with open ends 27, 29. In some embodiments, the bin handle cradle 28 is constructed from a resilient material such as PVC or other plastics.

Figure 6A:
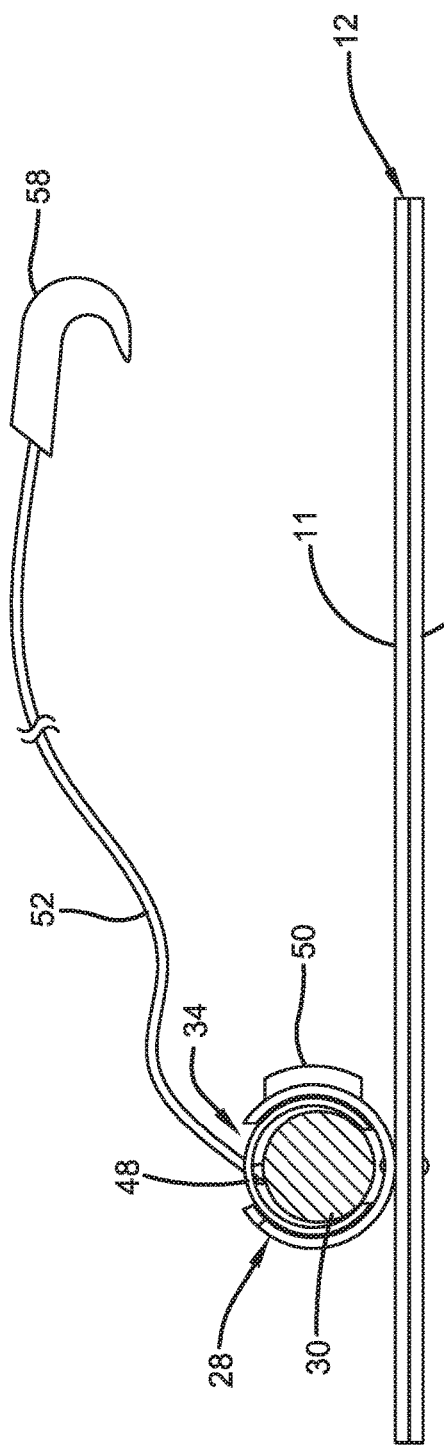
FIG. 6A is a cross section taken along the line 3-3 of FIG. 1 and schematically showing the receipt of a handle of a dolly-style trash bin in the cradle portion of the transport device according to some embodiments, and showing another type of retainer to help retain the handle in the cradle.
Figure 6B:
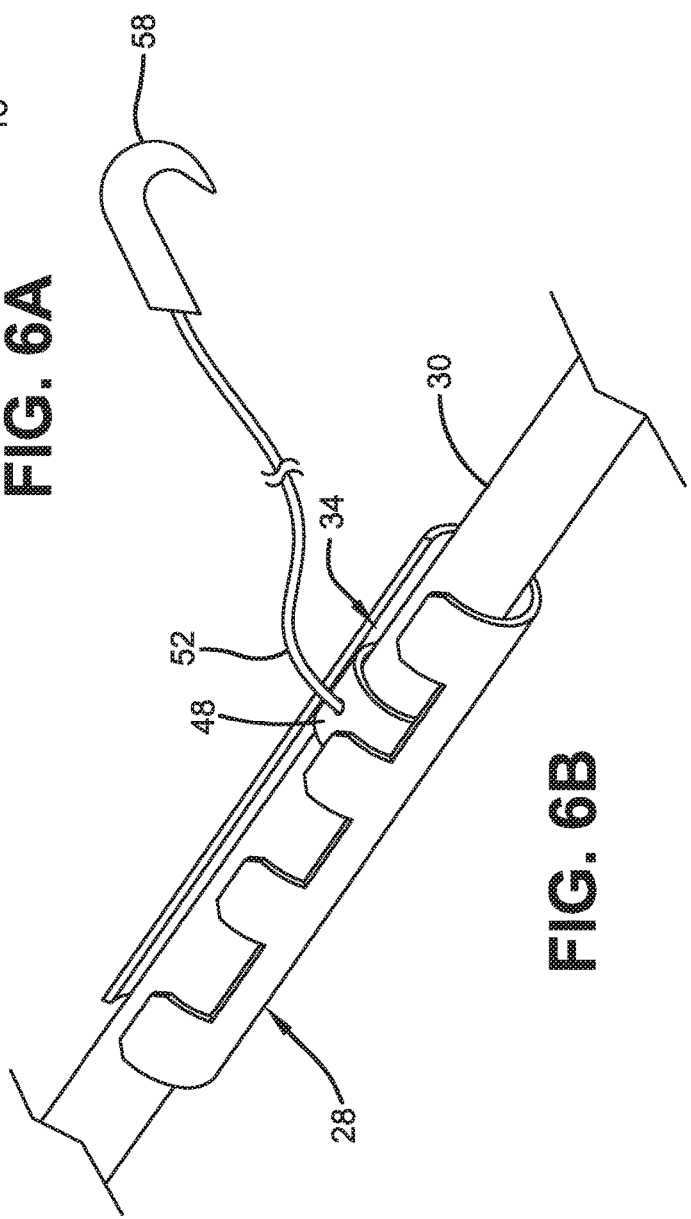
FIG. 6B is a perspective view of the of FIG. 6A retainer relative to a cradle portion

As shown in FIGS. 5 and 6, some embodiments of the transport device 10 include a retainer 46 (FIG. 5) or a retainer 48 (FIG. 6) adapted to interact with the bin handle cradle 28 to resist removal of the dolly handle 30 from the bin handle cradle 28. The retainer 46, 48 is selectively mounted to the bin handle cradle 28 to close off the handle opening 34 and resist removal of the handle 30 through opening 34. In the embodiment of FIG. 5, the retainer 46 fits over the bin handle cradle 28 when the handle 30 is received therein, and spans the opening 34 to close it off from easy removal of the handle 30. In some embodiments, the retainer 46 is cylindrical and fits around a cylindrical bin handle cradle 28, spanning the opening, and, in some such embodiments, the retainer 46 snap fits onto the cradle 28. In the embodiment of FIG. 6, the retainer 48 fits within the bin handle cradle 28, between the exterior of the handle 30 and the interior of the cradle 28, and spans the opening 34. In some embodiments, the retainer 49 is cylindrical and snap fits around a cylindrical handle 30 to span the opening 34, and, in some embodiments, the retainer 48 can be inserted at the location of a gap 44, as later disclosed.

In some embodiments, after the transport device 10 has been secured to the vehicle v and the dolly handle 30 is placed inside the bin handle cradle 28 the retainer 46 can snap over or slide around the outside surface of the bin handle cradle 28. The retainer 46 is sized to resist removal from the bin handle cradle 28 by forces from the dolly handle 30 inside of the bin handle cradle 28 pushing radially outward during transport of the dolly-style trash bin 32.

In other embodiments, after the transport device 10 has been secured to the vehicle v and the dolly handle 30 is placed inside the bin handle cradle 28 the retainer 48 can snap into or slide inside the inside surface of the bin handle cradle 28. The retainer 48 is sized to resist removal from the bin handle cradle 28 by forces from the dolly handle 30 inside of the bin handle cradle 28 pushing radially outward during transport of the dolly-style trash bin 32. Application of the retainer 48 to the bin handle cradle 28 can be made easier by having the handle opening 34 vary in size along the width of the cradle 28. In areas where the handle opening 34 is larger (at gaps 44 later disclosed) the retainer 48 can be snapped around the handle then slid to a location where the handle opening 34 is smaller (at teeth 40), where the retainer 48 can resist a greater amount of force before being removed.

In some embodiments, the transport device 10 includes a protective material 50 on an exterior surface of the bin handle cradle 28 reducing the likelihood of marking the vehicle v with the transport device 10 and/or trash bin 32 during transport of the trash bin 32 with a vehicle v. The protective material 50 is configured to protect the vehicle v in the event the transport device 10 flexes into the vehicle v during transport, especially in situations where transport involves steep declination that might allow the tow pad 12 to slide up relative to the vehicle allowing the cradle 28 to in some instances come into contact with the vehicle. The protective material 50 can be made of the same material as the protective tow pad 12. In some embodiments the protective material 19 similar to the tow pad 12, including a backing material and fabric, the backing material selected from rubber, recycled rubber, vinyl, urethane, recycled vinyl, polypropylene, and the like, and the fabric selected from cotton, synthetic fabrics, plant products, and the like.

In some embodiments the protective material 50 is a 100% laminated, extruded, and compressible latex backing material with a 100% interwoven polyester fabric.

Figure 8:
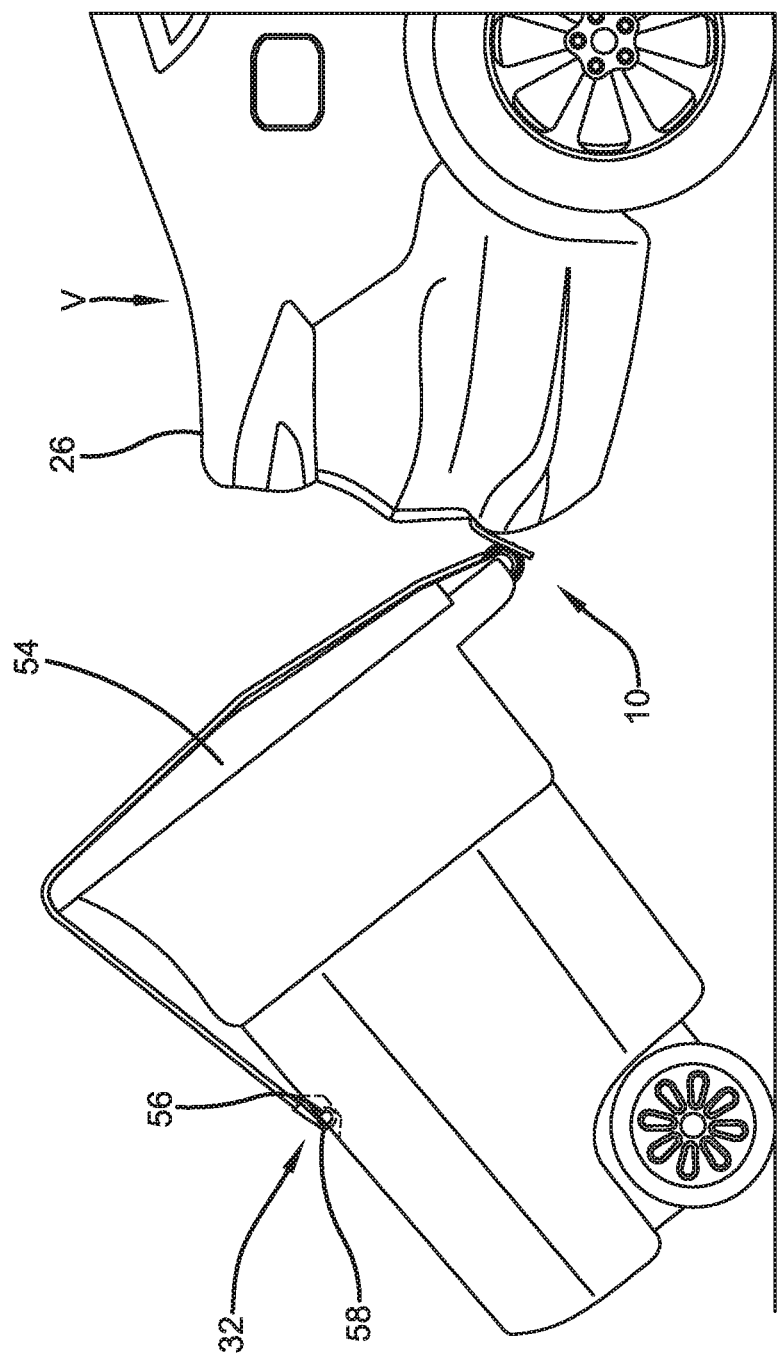
FIG. 8 is a side view showing a transport device carrying a dolly-style trash bin at the trunk of a vehicle according to some embodiments.

In some embodiments, as shown in FIGS. 5 and 8, the retainer 46 includes an attached securing line 52. Similarly, in some embodiments, as seen in FIG. 6, the retainer 48 can similarly be configured with an attached securing line 52. In some embodiments, the attached securing line 52 can be selected from chain links, rope, bungee cord, straps, etc., and the term line is to be interpreted sufficient to broadly cover all such tie downs. When employed, the securing line 52 is intended to be pulled over the lid 54 of the bin 32, and releasably attached to any number of securing points 56 on the bin 32 so as to hold down the lid 54. The attached securing line 52 provides additional securing in holding down to the trash bin 32 during use of the transport device 10. In some embodiments a hook 58 is provided at the end of the securing line 52 to attach to a securing point 56.

Figure 9:
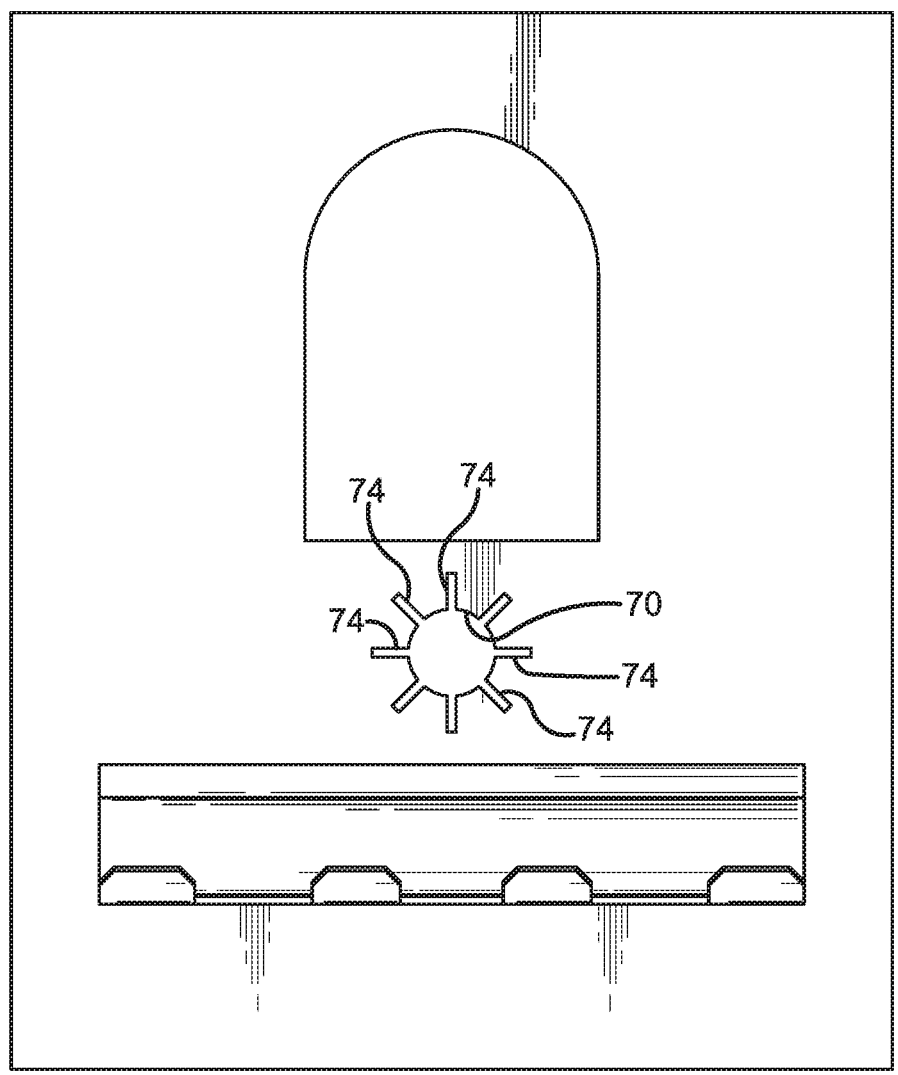
FIG. 9 is a top view of a transport device of this invention according to some embodiments having a ball hitch mounting option.

In some embodiments, as shown in FIG. 9, the tow pad 12 further comprises a ball hitch aperture 70 adapted to selectively permit the mounting of the transport device 10 to a ball hitch 72 of a vehicle v. In some embodiments, the ball hitch aperture 70 is shaped to allow the ball hitch 72 to slide through, allowing the pad 12 to hang from the hitch 72, as shown in FIG. 9. In some such embodiments, the aperture is defined by at least one radial cut 74, and in some embodiments 3 or more radial cuts 74 that define fingers 76 to assist in gripping a ball hitch 72 when the ball hitch 72 is slide through the aperture 70. The choice of material for the pad 12 will assist, but materials that tend to retain a desired shape will produce fingers 76 that tend to grip the ball hitch 72.

In other embodiments, such as in FIG. 11, the aperture 70 is a simple aperture with or without fingers being defined, and the aperture simply allows the threaded stem 78 of the ball hitch 72 to extend therethrough, allowing to pinch the tow pad 12 between the ball hitch 72 and the ball hitch receiver 80 to which it mounts typically via a nut 82.

Figure 12:
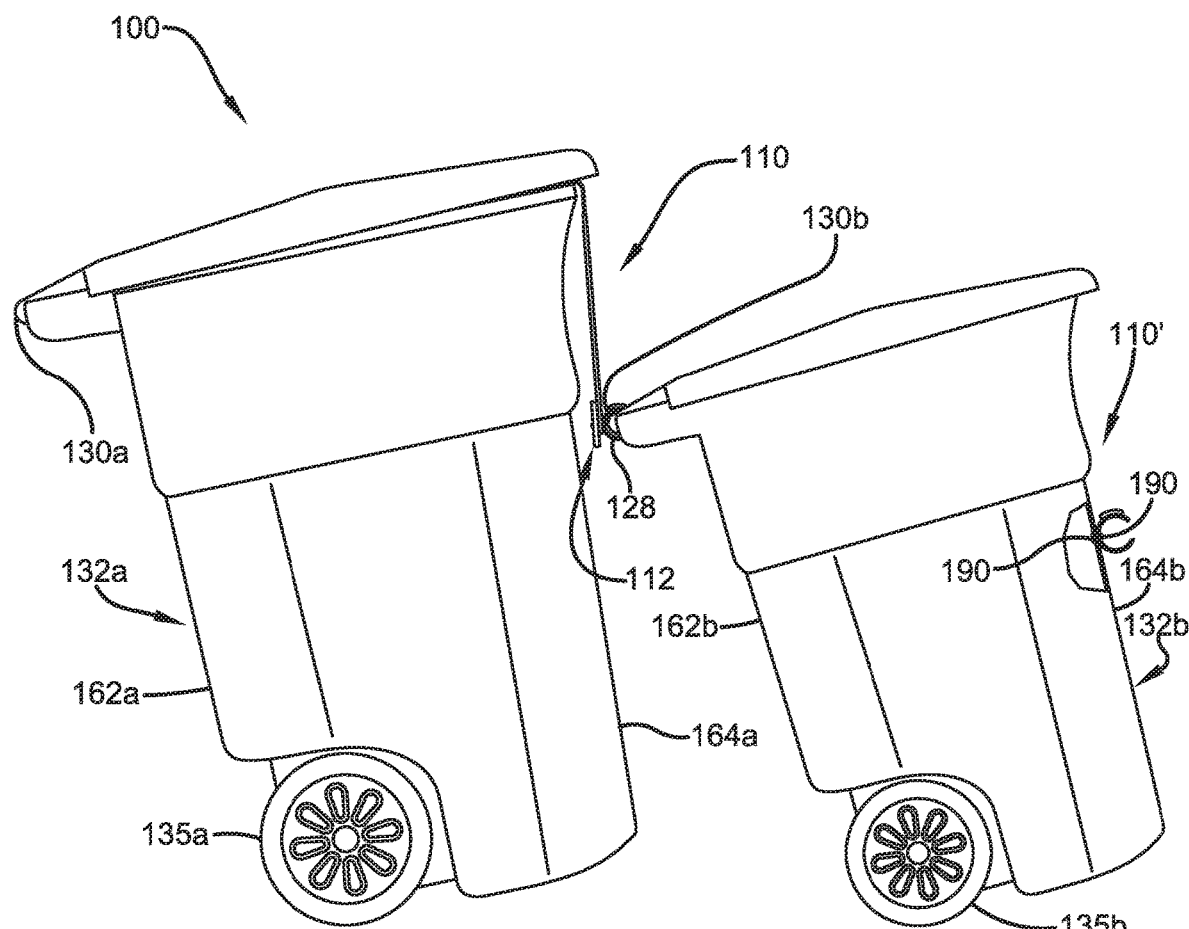
FIG. 12 is a side view of the employment of two different embodiments of a tandem transport device for connecting a dolly-style trash bin to another dolly-style trash bin.
Figure 13:
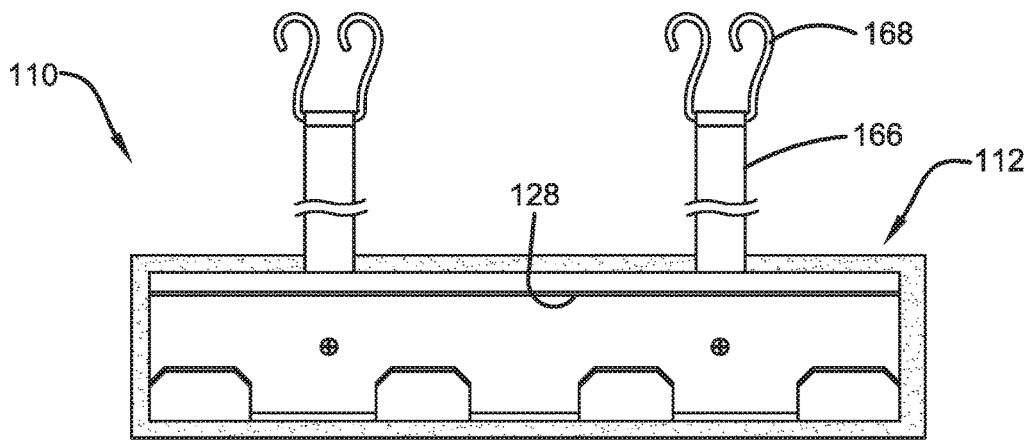
FIG. 13 is a top view of a tandem transport device, showing alternate versions by showing an optional mounting strap.

As the above transport device concepts were being developed, it was realized that some of the concepts could be applied to allow one to create a train of two or more dolly-style trash bins connected together. Thus, FIGS. 12 and 13 show a tandem trash bin arrangement 100, and two ways of providing a tandem transport device 110 to create such arrangements. The overlaps between this invention and that previously disclosed will be evident, and like parts receive like numerals though increased by 100.

In an embodiment of the bin arrangement 100, a first dolly-style trash bin 132a includes a dolly handle 130a and wheels 135a at a leading side 162a opposite a trailing side 164a. A second dolly-style trash bin 132b includes a dolly handle 130b and wheels 135b at a leading side 162b opposite a trailing side 164b. A first exemplary embodiment of a tandem transport device 110 is retained at the trailing side 164a of the first dolly-style trash bin 132a, and is shown with the dolly handle 130b of the second dolly-style trash bin 132b received in a handle mount 128 such that the second dolly-style trash bin 132b is mounted to the first dolly-style trash bin 132a for transportation of both through manipulation of the dolly handle 130a of the first dolly-style trash bin 132a.

In some embodiments, the tandem transport device 110 includes a handle mount 128 mounted to straps 166 having hooks 168 to mount the device 110 at the rim of a trash bin, as shown. The straps are adjustable in length in some embodiments to allow a variable ride height of the handle mount 128. The handle mount 128 can be virtually any simple mounting structure and thus is not termed a "cradle"

in the broadest disclosure. However, it should be appreciated that the cradle as described in all its various embodiments can be employed as a handle mount in this and the tandem transport device 110' that will be describe at the appropriate time below. Indeed, the cradle 28 described above is a useful design and particularly used in some embodiments, such shown in the drawings. Retainers such as already disclosed with respect to FIGS. 5A, 5B, 6A, and 6C might also be employed. A pad 112 might be secured in front of the handle mount 128 for reinforcement or protection.

A second exemplary embodiment of a tandem transport device, designated 110', is retained at the trailing side 164*b* of the second dolly-style trash bin 132*b*, and is shown without any dolly handle received therein, though the potential is obviously evident. The tandem transport device 110' includes a handle mount 128 as disclosed above, but it is directly mounted (i.e. retained) at a desired position at the trailing side 164*b*, rather than retained by straps and hooks. Any appropriate fastener 190 can be used to mount through the sidewall of a trash bin, with or without reinforcement at that area of securement.

Either of the tandem transport device 110 or 110' might be employed to practice tandem transport of trash bins. Two or more trash bins can be trained together and moved through implementation of these tandem transport concepts.

In some embodiments, the handle mount 128, is retained at a height of from 16 to 24 inches above the base of the bin (i.e., above ground level). In some embodiments, the handle mount 128 is retained at from 18 to 22 inches, and in some embodiments about 20 inches above the base of the bin, whether by being directly mounted or by hanging from straps or otherwise. It will be appreciated that is somewhat dependent on the type of bin used, the bin's original handle location, and also the comfort level of the user. It is easily removable, and thus "adjustable" by nature of re-attachment using the same hardware In light of the foregoing, it should be appreciated that the present invention significantly advances the art by providing a transport device that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A transport device for transporting a wheeled trash bin using a vehicle, the transport device comprising:
    a protective tow pad having a bottom face and a top face, the bottom face, in use, facing and contacting the vehicle:
        a trunk latch opening,
        a right wing portion extending to the right of the trunk latch opening, and
        a left wing portion extending to the left of the trunk latch opening, wherein the trunk latch opening is adapted to permit the operation of a trunk latch mechanism of a vehicle through the trunk latch opening to pinch the right wing portion and the left wing portion between a trunk door and a trunk jamb and thereby secure the transport device to the vehicle; and
    a bin handle cradle secured to extend from the top face of the protective tow pad and fully within the dimensions of the top face, the bin handle cradle adapted to receive a handle of the trash bin, wherein the protective tow pad is formed of a compressible material and the bin handle cradle is secured to the top face of the protective tow pad such that, in use, the compressible material is positioned between the entirety of the bin handle cradle and the vehicle, and extends beyond all dimensions of the bin handle cradle, such that, when the transport device is secured to the vehicle and the handle of the trash bin is received in the bin handle cradle, the protective tow pad is fully between the vehicle and the bin handle cradle to reduce the likelihood of marking the vehicle with the transport device and/or trash bin during transport of the trash bin with a vehicle.

2. The transport device of claim 1, wherein the right wing portion is at least 4 inches in width where pinched by the trunk door and trunk jamb, and the left wing portion is at least 4 inches in width where pinched by the trunk door and trunk jamb.

3. The transport device of claim 1, wherein the protective tow pad is custom fit to a particular vehicle model to lay over the portions of the vehicle that are exterior to the trunk at the location of securing the transport device to the vehicle.

4. The transport device of claim 1, wherein the trunk latch opening is large enough to provide at least a 2.5 inch diameter hole to allow the transport device to be secured in different positions relative to the trunk latch mechanism.

5. The transport device of claim 1, wherein the bin handle cradle is shaped to resist removal of the handle to resist the handle being jostled out of the bin handle cradle during transport with a vehicle.

6. The transport device of claim 5, wherein the bin handle cradle includes a handle opening having a top end and bottom end distanced from each other by a distance less than an insertion height of the handle to resist insertion and removal of the handle.

7. The transport device of claim 6, wherein the bin handle cradle is elongate and the handle opening is elongate, extending along a width of the trunk when secured to the vehicle.

8. The transport device of claim 1, further comprising a retainer adapted to interact with the bin handle cradle to resist removal of the handle from the bin handle cradle.

9. The transport device of claim 8, wherein the bin handle cradle includes a handle opening, and the retainer is selectively mounted to the bin handle cradle to close off the handle opening.

10. The transport device of claim 1, further comprising protective material on an exterior surface of the bin handle cradle reducing the likelihood of marking the vehicle with the transport device and/or trash bin during transport of the trash bin with a vehicle.

11. The transport device of claim 1, wherein the tow pad further comprises a ball hitch aperture adapted to selectively permit the mounting of the transport device to a ball hitch receiver of a vehicle.

12. A transport device for transporting a wheeled trash bin using a vehicle, the transport device comprising:
    a protective tow pad having:
        a trunk latch opening,
        a right wing portion extending to the right of the trunk latch opening, and
        a left wing portion extending to the left of the trunk latch opening, wherein the trunk latch opening is adapted to permit the operation of a trunk latch mechanism of a vehicle through the trunk latch opening to pinch the right wing portion and the left wing portion between a trunk door and a trunk jamb and thereby secure the transport device to the vehicle; and a bin handle cradle secured to the protective tow pad and adapted to receive a handle of the trash bin and shaped to resist removal of the handle to resist the handle being jostled out of the bin handle cradle during transport with a vehicle, wherein the bin handle cradle includes a handle opening having a top end and bottom end distanced from each other by a distance less than an insertion height of the handle to resist insertion and removal of the handle, the apparatus further comprising a retainer adapted to interact with the bin handle cradle to resist removal of the handle from the bin handle cradle.

13. The transport device of claim 12, wherein the protective tow pad reduces the likelihood of marking the vehicle with the transport device and/or trash bin during transport of the trash bin with a vehicle.

14. The transport device of claim 12, wherein the retainer is selectively mounted to the bin handle cradle to close off the handle opening.

15. A transport device for transporting a wheeled trash bin using a vehicle, the transport device comprising:
a protective tow pad having:
a trunk latch opening,
a right wing portion extending to the right of the trunk latch opening, and
a left wing portion extending to the left of the trunk latch opening, wherein the trunk latch opening is adapted to permit the operation of a trunk latch mechanism of a vehicle through the trunk latch opening to pinch the right wing portion and the left wing portion between a trunk door and a trunk jamb and thereby secure the transport device to the vehicle; and a bin handle cradle secured to the protective tow pad and adapted to receive a handle of the trash bin, wherein the tow pad further comprises a ball hitch aperture adapted to selectively permit the mounting of the transport device to a ball hitch receiver by receiving a stem of a ball hitch therethrough to pinch the tow pad between the ball hitch and a ball hitch receiver to which the ball hitch selectively mounts.

16. The transport device of claim 15, wherein the protective tow pad is formed of a compressible material and the bin handle cradle is secured to the protective tow pad such that, in use, the compressible material is positioned between the entirety of the bin handle cradle and the vehicle so as to cushion forces on the vehicle under the weight of a trash bin, when the transport device is secured to the vehicle and the handle of the trash bin is received in the bin handle cradle.

17. The transport device of claim 16, wherein the compressible material forms the right wing portion and the left wing portion and is compressed between the trunk door and trunk jamb when the transport device is secured to the vehicle.

18. The transport device of claim 17, wherein the protective tow pad is formed from a fabric backed with a backing material.

* * * * *